(12) United States Patent
Yamamoto

(10) Patent No.: US 9,660,429 B2
(45) Date of Patent: May 23, 2017

(54) ELECTRICAL WIRE PROTECTION TUBE AND WIRE HARNESS

(71) Applicant: Sumitomo Wiring Systems, Ltd., Yokkaichi, Mie (JP)

(72) Inventor: Morichika Yamamoto, Mie (JP)

(73) Assignee: Sumitomo Wiring Systems, Ltd., Yokkaichi, Mie (JP)

( * ) Notice: Subject to any disclaimer, the term of this patent is extended or adjusted under 35 U.S.C. 154(b) by 0 days.

(21) Appl. No.: 15/192,489

(22) Filed: Jun. 24, 2016

(65) Prior Publication Data

US 2016/0380417 A1 Dec. 29, 2016

(30) Foreign Application Priority Data

Jun. 29, 2015 (JP) ................................ 2015-129878

(51) Int. Cl.
 *H02G 3/04* (2006.01)
 *B60R 16/02* (2006.01)

(52) U.S. Cl.
 CPC ....... *H02G 3/0475* (2013.01); *B60R 16/0215* (2013.01)

(58) Field of Classification Search
 CPC combination set(s) only.
 See application file for complete search history.

(56) References Cited

U.S. PATENT DOCUMENTS

| 3,896,259 A | * | 7/1975 | Fry | F16L 3/22 |
| | | | | 156/178 |
| 4,051,383 A | * | 9/1977 | Dola | H01B 7/0045 |
| | | | | 174/72 A |
| 5,105,054 A | * | 4/1992 | Kirma | H01B 7/0045 |
| | | | | 174/2 |
| 6,425,418 B1 | | 7/2002 | Maeda | |
| 7,064,276 B2 | | 6/2006 | Sakabe | |

FOREIGN PATENT DOCUMENTS

| JP | 2001124250 A | 5/2001 |
| JP | 2004215494 A | 7/2004 |

* cited by examiner

*Primary Examiner* — Dhirubhai R Patel
(74) *Attorney, Agent, or Firm* — Reising Ethington, P.C.

(57) ABSTRACT

A electrical wire protection tube and a wire harness that can prevent breakage of a wire arranged in the handle swing portion of a two-wheeled vehicle. The electrical wire protection tube includes a tube main body portion made up of ring-shaped ribs and small-diameter short tube portions that are a resin molded body and are alternatingly arranged in a single line so as to form one passageway for an electrical wire. Each ring-shaped ribs has a maximum-diameter ridgeline portion and first and second truncated cone surface portions that are respectively located on different sides of the ridgeline portion and are inclined toward the small-diameter short tube portions. When the tube main body portion is bent into a U shape, the small-diameter short tube portions stretch on one side such that the first and second truncated cone surface portions of adjacent ring-shaped ribs come into close contact on the opposite side.

2 Claims, 4 Drawing Sheets

ELECTRICAL WIRE PROTECTION TUBE AND WIRE HARNESS

This Application claims the benefit of Japanese Application No. JP2015-129878, filed on Jun. 29, 2015, the contents of which are hereby incorporated by reference in their entirety.

FIELD

The present invention relates to an electrical wire protection tube and a wire harness.

BACKGROUND

Conventionally, endoscopes, catheters, wire guides, and the like are constituted using a flexible tube obtained by forming a tube-shaped sheath film around a metal or resin coil core, or a communication line protection tube whose inner peripheral wall surface portion is a hard resin layer with ring-shaped grooves or a spiral groove formed therein, and whose outer peripheral wall surface portion is a soft resin layer that is softer than the inner peripheral wall surface portion (e.g., see JP 2001-124250A and JP 2004-215494A, which are respectively referred to as Patent Document 1 and Patent Document 2 below).

Furthermore, as shown in FIG. 4, a conventional general wire harness 101 used in two-wheeled vehicles includes an electrical wire 103 inserted through an electrical wire protection tube 102 obtained by molding an elastomer into a tube shape, for example. In particular, in the handle swing portion of a two-wheeled vehicle, the wire harness 101 is arranged along a bent path, and the ability of the handle to rotate relative to the frame is maintained However, with the above-described wire harness 101, there is a problem in that if the wire harness 101 is bent 180 degrees during an operation for rotating the handle of the two-wheeled vehicle or the like, the electrical wire protection tube 102 itself becomes folded in half, and there is concern that the electrical wire 103 will become broken.

The present design was achieved in order to solve the above-described issue, and an object thereof is to provide an electrical wire protection tube and a wire harness that can prevent breakage of an electrical wire arranged in a handle swing portion of a two-wheeled vehicle or the like.

SUMMARY

In order to achieve the above object, an electrical wire protection tube according to one embodiment includes: a tube main body portion that is made up of ring-shaped ribs and small-diameter short tube portions that are a resin molded body and are alternatingly arranged in a single line so as to form one passageway for passage of an electrical wire, holes of the ring-shaped ribs and holes of the small-diameter short tube portions having the same diameter, wherein in each of the ring-shaped ribs, a diameter corresponding to a central portion in an axial direction is a maximum diameter, each of the ring-shaped ribs has a maximum-diameter ridgeline portion and inclined surfaces that are respectively located on one side and another side of the ridgeline portion and are inclined toward the small-diameter short tube portions, and when the tube main body portion is bent into a U shape, the small-diameter short tube portions stretch on one side such that three to eight of the ring-shaped ribs that are adjacent to each other are located in a 180-degree bending range on a side opposite to a side on which the small-diameter short tube portions are stretched, inclined surfaces of the adjacent ring-shaped ribs being in close contact with each other.

Also, in order to achieve the above object, a wire harness according to one embodiment includes: an electrical wire; and the electrical wire protection tube described above, wherein the electrical wire is inserted into the passageway of the tube main body portion.

According to the above configuration, with the electrical wire protection tube and the wire harness, when the tube main body portion with the electrical wire inserted into the passageway is bent 180 degrees at a predetermined location, the tube main body becomes bent into a U shape, the small-diameter short tube portions stretch on one side, and the inclined surfaces of ring-shaped ribs that are adjacent to each other come into close contact on the side opposite to the side on which the small-diameter short tube portions are stretched. In the 180-degree bending range, three to eight ring-shaped ribs are side-by-side with their inclined surfaces in close contact, and the small-diameter short tube portions do not become closed up in a flattened shape, thus making it possible to protect the electrical wire so as to not become subjected to pressure.

For this reason, with the electrical wire protection tube and the wire harness, the tube main body portion itself does not become folded in half, and it is possible to prevent breakage of the electrical wire that is inserted into the passageway of the tube main body portion and arranged in the handle swing portion of a two-wheeled vehicle or the like.

Accordingly, it is possible to provide an electrical wire protection tube and a wire harness that can prevent breakage of an electrical wire arranged in a handle swing portion of a two-wheeled vehicle or the like.

DRAWINGS

Figure 1:
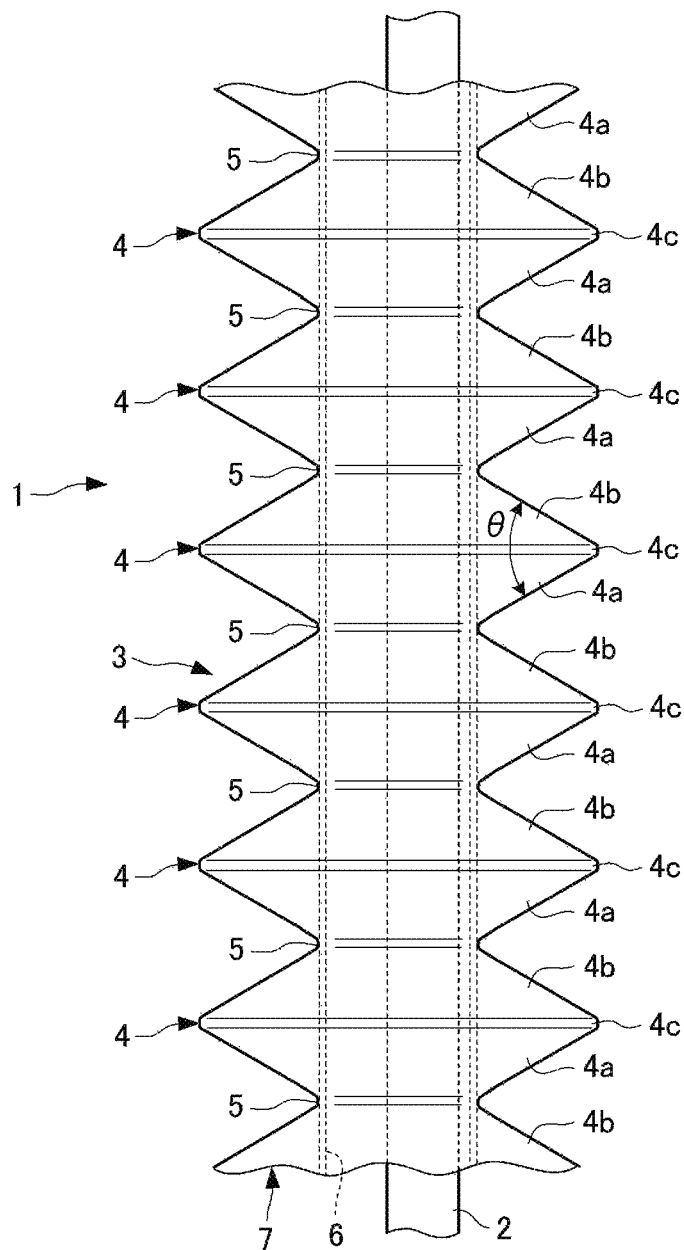
FIG. 1 is a schematic external view of a wire harness according to one embodiment, in a state before bending of a tube main body portion of an electrical wire protection tube into which an electrical wire has been inserted.
Figure 3:
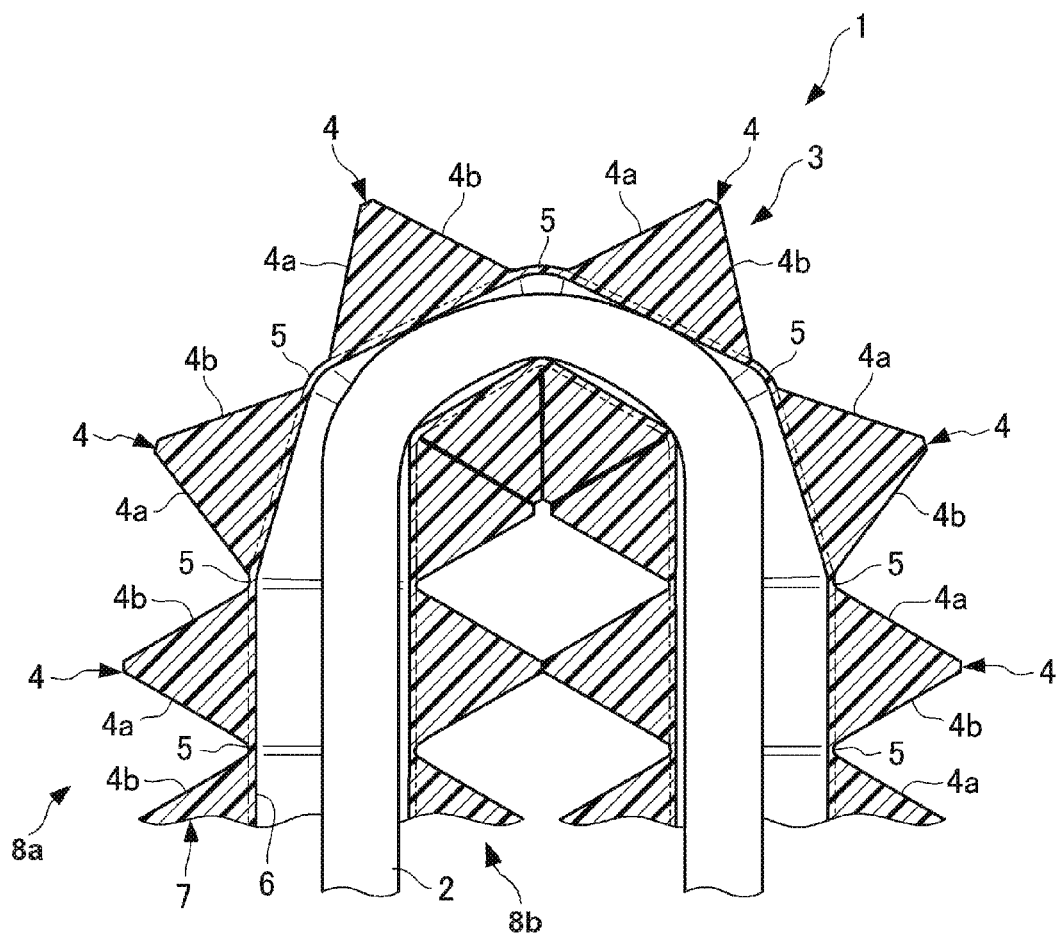
Figure 4:
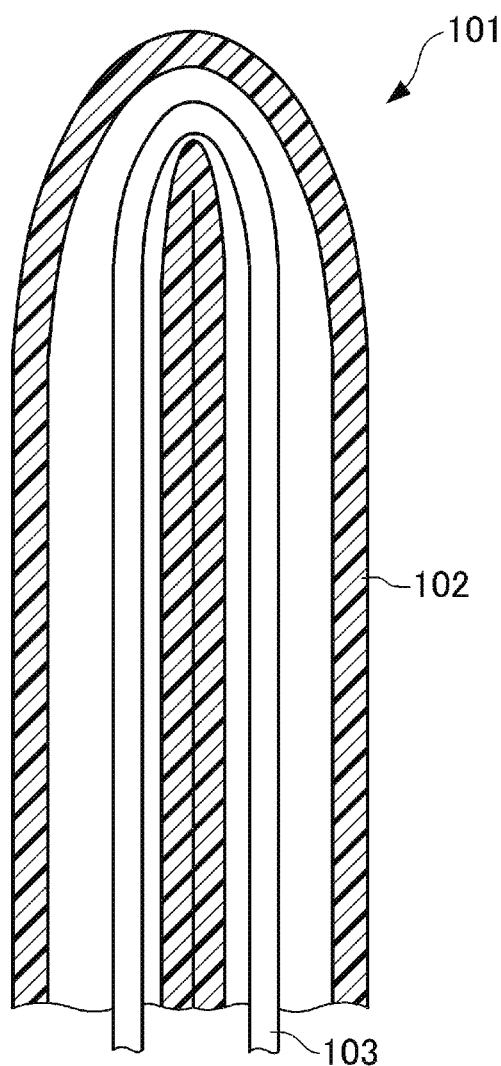

FIG. 3 is a schematic vertical cross-sectional view of the wire harness according to the embodiment of FIG. 1, in a state after 180-degree bending at the predetermined location in the tube main body portion of the electrical wire protection tube into which the electrical wire has been inserted; and FIG. 4 is a schematic vertical cross-sectional view of a conventional wire harness for a two-wheeled vehicle.

DESCRIPTION

Hereinafter, an electrical wire protection tube and a wire harness will be described with reference to the drawings.

Figure 2:
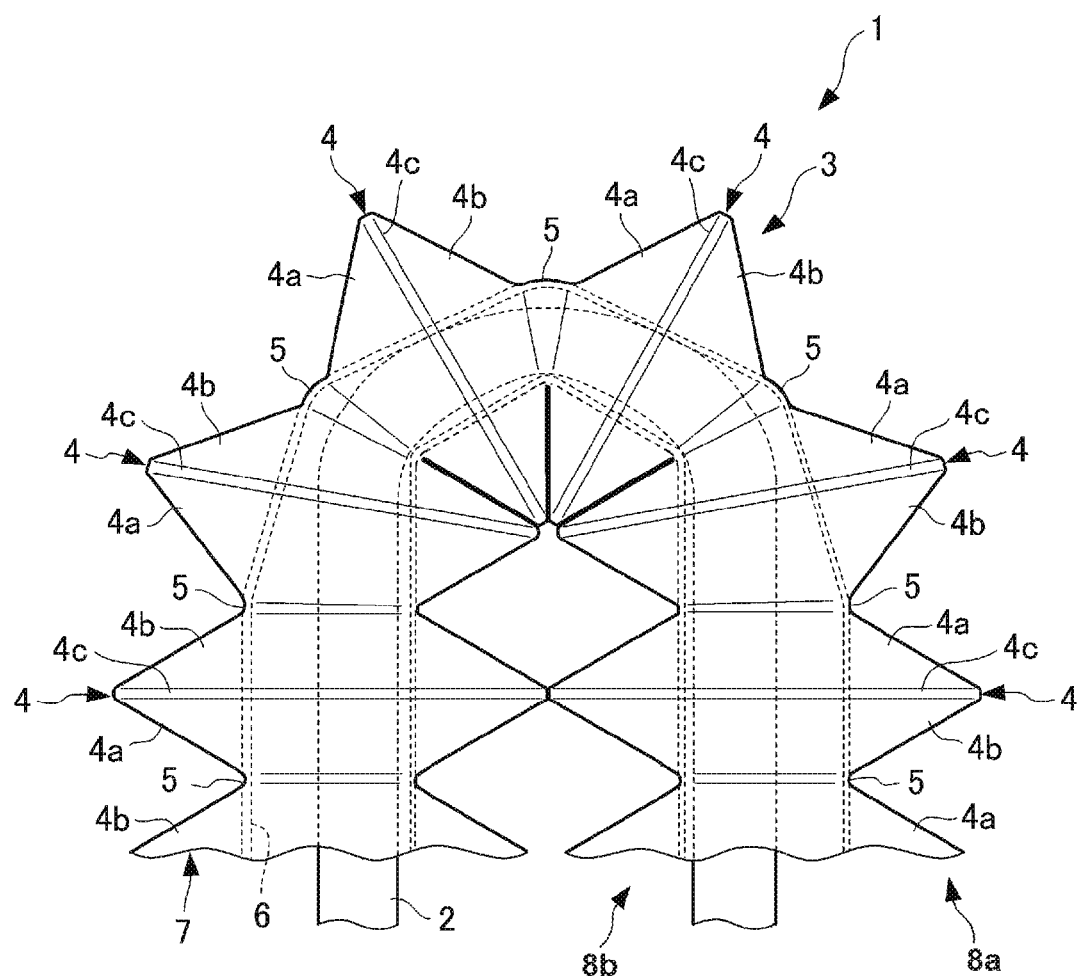
FIG. 2 is a schematic external view of the wire harness according to the embodiment of FIG. 1, in a state after 180-degree bending at a predetermined location in the tube main body portion of the electrical wire protection tube into which the electrical wire has been inserted.

As shown in FIGS. 1 to 3, a wire harness 1 has an electrical wire 2 and an electrical wire protection tube 3, and is arranged in a handle swing portion of a two-wheeled vehicle (not shown).

The electrical wire protection tube 3 is a resin molded body formed by an elastomer such as ethylene-polypropylene-diene rubber, and includes a tube main body portion 7 made up of ring-shaped ribs 4 and small-diameter short tube portions 5 that are alternatingly arranged in a single line so as to form one passageway 6 for the passage of an electrical wire 2. The holes of the ring-shaped ribs 4 and the holes of the small-diameter short tube portions 5 have the same diameter.

In the ring-shaped ribs 4, the diameter corresponding to the central portion in the axial direction is the maximum diameter. The ring-shaped ribs 4 are formed in the shape of abacus beads, that is to say, the ring-shaped ribs 4 each have a first truncated cone surface portion 4a and a second truncated cone surface portion 4b that are inclined toward the small-diameter short tube portions 5 and are respectively located on one side and another side of a maximum-diameter ridgeline portion 4c.

In the cross-sectional shape of the ring-shaped ribs 4 along the axial direction, a vertex angle θ between the first truncated cone surface portion 4a and the second truncated cone surface portion 4b is set to 60 degrees.

Here, the first truncated cone surface portion 4a corresponds to the inclined surface on one side of the present invention, and the second truncated cone surface portion 4b corresponds to the inclined surface on the other side.

The small-diameter short tube portions 5 each have a wall thickness of 1.0 to 2.5 mm, are stretchable, and have an axial length of 1.0 to 3.0 mm, for example.

The wire harness 1, that is to say the electrical wire protection tube 3 obtained by inserting the electrical wire 2 into the passageway 6 of the tube main body portion 7, is bent on a drawing board so as to be given a shape suited to being arranged in the handle swing portion of a two-wheeled vehicle, for example, and then a part such as a connector (not shown) is attached to the end portion of the electrical wire 2.

The two ends of the electrical wire 2 and the electrical wire protection tube 3 are fixed to each other by taped fixing portions (not shown) obtained by wrapping adhesive tape in a half-lap manner around the ends.

During an operation for rotating the handle of the two-wheeled vehicle or the like, if the wire harness 1 of the present embodiment is bent with the smallest radius of curvature such that the tube main body portion 7 with the electrical wire 2 inserted in the passageway 6 is bent 180 degrees at a predetermined location in a U shape, four ring-shaped ribs 4 and five small-diameter short tube portions 5 become located in the bending region.

In the four ring-shaped ribs 4 that are adjacent in the bending region, the ridgeline portions 4c approach each other on the side toward the center of the radius of curvature, and first truncated cone surface portions 4a and second truncated cone surface portions 4b abut against each other at three locations. The five small-diameter short tube portions 5 located in the bending region become stretched on one side 8a of the tube main body portion 7 that is distant from the center of the radius of curvature, and aid the above-described abutting of the first truncated cone surface portions 4a and the second truncated cone surface portions 4b which become in close contact with each other on an opposite side 8b of the tube main body portion 7 that is closer to the center of the radius of curvature.

For this reason, the tube main body portion 7 bends gently with the five small-diameter short tube portions 5 serving as joints in the bending region, and therefore the tube main body portion 7 itself does not become folded in half, and it is possible to prevent breakage of the electrical wire 2 that is inserted into the passageway 6 of the tube main body portion 7 and arranged in the handle swing portion of a two-wheeled vehicle or the like.

In the example described above, when the wire harness 1 and the electrical wire protection tube 3 are bent with the smallest radius of curvature such that the tube main body portion 7 is bent 180 degrees at a predetermined location in a U shape, four ring-shaped ribs 4 and five small-diameter short tube portions 5 become located in the bending region. However, the vertex angle θ between the first truncated cone surface portion 4a and the second truncated cone surface portion 4b in the cross-sectional shape of the ring-shaped ribs 4 in the axial direction can be determined such that, for example, three or five to eight ring-shaped ribs 4 are located in the bending region when the tube main body portion 7 is bent at the predetermined location as described above.

Although the maximum-diameter ridgeline portions 4c of the ring-shaped ribs 4 have a linear shape in the wire harness 1 and the electrical wire protection tube 3 of the present embodiment, they can be cylindrical surfaces having a width in the axial direction, or crown-shaped cylindrical surfaces.

Although one electrical wire 2 is inserted into the passageway 6 of the tube main body portion 7 of the wire harness 1 and the electrical wire protection tube 3 of the present embodiment, multiple electrical wires 2 can be inserted into the passageway 6 of the tube main body portion 7.

As described above, an electrical wire protection tube and a wire harness according to the present design have an effect of being able to prevent breakage of an electrical wire arranged in the handle swing portion of a two-wheeled vehicle or the like, and are useful to general electrical wire protection tubes and wire harnesses.

It is to be understood that the foregoing is a description of one or more preferred exemplary embodiments of the invention. The invention is not limited to the particular embodiment(s) disclosed herein, but rather is defined solely by the claims below. Furthermore, the statements contained in the foregoing description relate to particular embodiments and are not to be construed as limitations on the scope of the invention or on the definition of terms used in the claims, except where a term or phrase is expressly defined above. Various other embodiments and various changes and modifications to the disclosed embodiment(s) will become apparent to those skilled in the art. All such other embodiments, changes, and modifications are intended to come within the scope of the appended claims.

As used in this specification and claims, the terms "for example," "e.g.," "for instance," "such as," and "like," and the verbs "comprising," "having," "including," and their other verb forms, when used in conjunction with a listing of one or more components or other items, are each to be construed as open-ended, meaning that the listing is not to be considered as excluding other, additional components or items. Other terms are to be construed using their broadest reasonable meaning unless they are used in a context that requires a different interpretation.

The invention claimed is:
1. An electrical wire protection tube comprising:
a tube main body portion that is made up of ring-shaped ribs and small-diameter short tube portions that are a resin molded body and are alternatingly arranged in a single line so as to form one passageway for passage of an electrical wire, holes of the ring-shaped ribs and holes of the small-diameter short tube portions having the same diameter,
wherein in each of the ring-shaped ribs, a diameter corresponding to a central portion in an axial direction is a maximum diameter, each of the ring-shaped ribs has a maximum-diameter ridgeline portion and inclined surfaces that are respectively located on one side and another side of the ridgeline portion and are inclined toward the small-diameter short tube portions, and when the tube main body portion is bent into a U shape, the small-diameter short tube portions stretch on one side of the tube main body portion and the inclined surfaces of the adjacent ring-shaped ribs become in close contact with each other on an opposite side of the tube main body portion such that three to eight of the ring-shaped ribs that are adjacent to each other are located in a 180-degree bending range.

2. A wire harness comprising:

an electrical wire; and the electrical wire protection tube according to claim 1, wherein the electrical wire is inserted into the passageway of the tube main body portion.

* * * * *